(No Model.)

C. F. SCOTT.
SYSTEM OF ELECTRICAL DISTRIBUTION.

No. 505,928. Patented Oct. 3, 1893.

Witnesses
Ralph D. Mershon

Inventor
Chas. F. Scott
By his Attorney
H. S. MacKay

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

SYSTEM OF ELECTRICAL DISTRIBUTION.

SPECIFICATION forming part of Letters Patent No. 505,928, dated October 3, 1893.

Application filed September 28, 1892. Serial No. 447,140. (No model.)

*To all whom it may concern:*

Be it known that I, CHARLES F. SCOTT, a citizen of the United States, residing in Pittsburg, in the county of Allegheny and State of Pennsylvania, have invented a new and useful Improvement in Systems of Electrical Distribution, (Case No. 509,) of which the following is a specification.

My invention has relation to improvements in systems of electric distribution wherein potential transforming devices are used for the purpose of producing higher potential on the line than is present at the generator.

My invention also includes the method of treatment whereby the ends hereinafter specified are attained.

The object of my invention is to obtain high tension currents on the line from a generator of comparatively low electro-motive force with a minimum converter capacity per watt transmitted, and at the same time to afford the best possible protection to the generator in case of accidental ground on the line.

By "converter" throughout the specification I mean any device, whether rotating or stationary, whereby electromotive force is modified.

Figure 1:
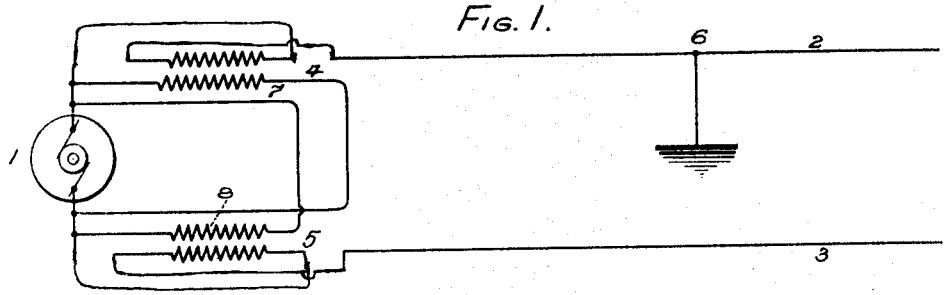
Figure 2:
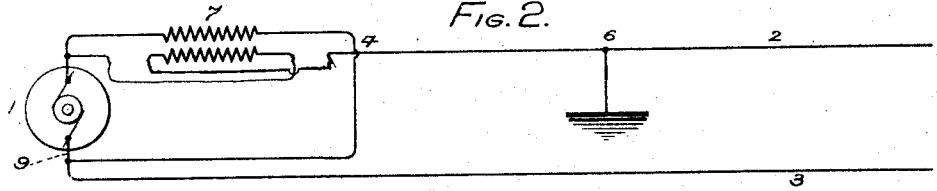

In the accompanying drawings, Figure 1 is a diagram of my improved arrangement of circuits. Fig. 2 is a diagram of an arrangement used before my invention, and Fig. 3 is a diagram of a modified form of my improvement.

Where it is desired to use currents of a high potential from generators of lower electromotive force, the most obvious means to employ is a step-up converter having its primary in circuit with the armature, and to put translating devices into circuit with the secondary of said converter. In such a case, for a given number of watts the converter capacity must be inconveniently large, and in order to reduce this capacity and nevertheless obtain the required increase of potential on the main line it has been proposed to use the system shown in Fig. 2. In this arrangement, the generator 1, is made to feed two circuits in multiple. One of these circuits includes only the primary 7, of a converter 4, while the other circuit includes the secondary thereof and the main line wherein high potential currents are to be employed. By these means it will be seen that the potential of the generator is added to that in the secondary of the converter, thus obtaining an increased potential in the main circuit with a less converter capacity than would be necessary if the converter primary were in the generator circuit and the main line totally distinct in the secondary of the converter. The main difficulty which has been found to exist in this arrangement is that in case of a ground on 6, for instance, the increased potential of the current passing through the generator creates a strain between the armature coils and the parts of the machine in connection with the earth which is very apt to cause rupture and burning of the insulation, consequently dismantling the generator. My invention is designed to obviate this difficulty by relieving the generator from a large portion of the stress incident to accidental ground.

Figure 3:
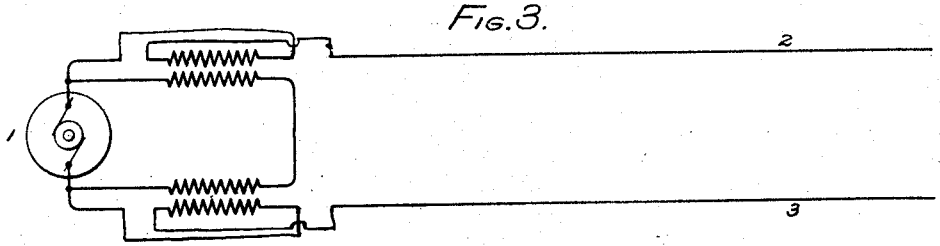

According to my improved arrangement three circuits are carried from the generator brushes as shown at Fig. 1, or two circuits may be used, as shown in Fig. 3. The main line 2, 3, is one circuit, the converter primary 7, is a second circuit, and the converter primary 8 is a third. The two secondaries of the converters are placed in series in the main circuit and one on each side of said translating devices as shown. The effect of this arrangement is to cause the addition of generator potential to secondary potential in each of the two converters, and the total excess of potential of the line over the generator is the sum of the two induced potentials.

In Fig. 3 I show the two primaries in multiple arc with the main line but in series with each other. The principle of this modification is the same as that embodied in Fig. 1, the main idea of my invention being the use of potential modifiers on each side of the translating devices.

If, now, a ground occur at 6, as shown in Fig. 1, the difference in potential between either dynamo brush and the ground will only be the difference between such brush and the point 6, and this difference will be just equal to that part of the line potential induced by the converter between the grounded point and the brush in question plus the potential of the generator when the brush is on the opposite side of the generator from the ground. On the other hand, in Fig. 2, if a ground were to occur at 6, the stress on the insulation at the brush 9 would be equal to the total line potential. The construction shown in Figs. 1 and 3 is, therefore, an improvement over that shown in Fig. 2, in that at no time is any portion of the generator subjected to the stress due to the total potential on the line.

What I claim is—

1. In a system of electrical distribution, a generator, a main line feeding translating device, and two potential modifiers having their primary circuits in multiple arc with the main line and their secondaries in series therewith on each side thereof.

2. The method of obtaining high potential on a main line fed by a generator of comparatively low potential which consists in dividing the current produced, carrying a part of the current to the main line and causing another part to act inductively upon that part of the main line between the positive brush of the generator and the translating devices, and also upon that part of the main line between the negative brush of the generator and the translating devices, substantially as described.

3. The method of obtaining high potential on a main line fed by a generator of comparatively low potential, which consists in dividing the current produced into three parts, carrying one part to the main line, causing a second part to act inductively upon that part of the main line between the positive brush of the generator and the translating devices, and causing a third part to act inductively upon that part of the main line between the negative brush of the generator and the translating devices, substantially as described.

In testimony whereof I have hereunto subscribed my name this 26th day of September, A. D. 1892.

CHAS. F. SCOTT.

Witnesses:
JAMES WM. SMITH,
HAROLD S. MACKAYE.